United States Patent [19]

Ichikawa et al.

[11] Patent Number: 4,693,565
[45] Date of Patent: Sep. 15, 1987

[54] COLLIMATOR LENS

[75] Inventors: Hiroyuki Ichikawa; Minoru Toyama, both of Takarazuka, Japan

[73] Assignee: Nippon Sheet Glass Co., Ltd., Osaka, Japan

[21] Appl. No.: 856,822

[22] Filed: Apr. 28, 1986

[30] Foreign Application Priority Data

May 7, 1985 [JP] Japan .................... 60-96424

[51] Int. Cl.⁴ .............................. G02B 3/00
[52] U.S. Cl. ................................. 350/413
[58] Field of Search ........................... 350/413

[56] References Cited

U.S. PATENT DOCUMENTS

| 4,634,233 | 1/1987 | Usami et al. | 350/413 |
| 4,639,094 | 1/1987 | Aono | 350/413 |
| 4,643,535 | 2/1987 | Ichikawa | 350/413 |
| 4,647,159 | 3/1987 | Baba | 350/413 |

Primary Examiner—John K. Corbin
Assistant Examiner—Scott J. Sugarman
Attorney, Agent, or Firm—Woodcock Washburn Kurtz Mackiewicz & Norris

[57] ABSTRACT

A collimator lens to be used for an optical recording/reproducing apparatus is constituted by a refractive index distribution type lens to satisfy specific conditions, thereby the invention provides the collimator lens which is good in the productivity and has the wave surface aberration being equivalent to or better than that of a collimator lens using a spherical lens.

1 Claim, 7 Drawing Figures

COLLIMATOR LENS

BACKGROUND OF THE INVENTION

1. Field of the Invention

The present invention relates to a collimator lens which is used in an optical recording/reproducing apparatus such as an optical disc system or a photomagnetic disc system.

2. Description of the Prior Art

In an optical disc system, for example, a collimator lens is used so as to convert an incident light from a semiconductor laser as a light source into a parallel beam and to project the parallel beam on an objective lens.

Since collimator lens in such an apparatus must collimate the incident light from semiconductor laser at low aberration, the residual wave surface aberration in rms value of the lens is required to be about $0.07\lambda$ ($\lambda$: wavelength) or less. Unlike objective lens, since collimator lens is fixed to an optical system and not provided with a servo mechanism, heat-resistant property is required so that deterioration of the optical performance of the lens due to heat may not arise. Of course, collimator lens is also required to be of small size, light weight and low price.

Such a collimator lens as known in the prior art is constituted by two ordinary spherical lenses with refractive index being uniform. In this case, however, the four lens surfaces must be polished into spherical surfaces. Moreover, the polishing is very difficult if the lens diameter is small. Further, technique of high degree is required in combining a plurality of lenses, such as sticking or centering. As a result, the lens is of high cost.

A plastic lens with non-spheric surface being in the limelight in recent years is weak to heat in comparison to glass or the like so it does not have reliability in the configuration accuracy during its use. Also the cost becomes high to form the non-spheric surface.

SUMMARY OF THE INVENTION

Accordingly, it is an object of the invention to provide a collimator lens which is good in productivity and has the wave surface aberration property being equivalent to or better than that of a conventional collimator lens using a spherical lens.

It is another object of the invention to provide a collimator lens which is producible at low cost.

It is still another object of the invention to provide a collimator lens having high reliability.

Above objects can be attained by the invention as follows. A collimator lens according to the invention consists in a refractive index distribution type lens of cylindrical transparent medium wherein the refractive index n(r) at position of the distance r from the center axis is expressed by $$N^2(r) = n_0^2 \{1 - (g \cdot r)^2 + h_4(g \cdot r)^4 + h_6(g \cdot r)^6 + h_8(g \cdot r)^8 + \cdots\}$$

and the incident surface and the outgoing surface are in parallel with each other, satisfying conditions that $$R_1 = R_2 = \infty \quad (1)$$

$$1.40/\sqrt{1-(g \cdot r)^2} \leq n_0 \leq 2.1 \quad (2)$$

$$1/\sqrt{f^2 - 23.43} \leq n_0 g \leq 1/(f \sin g) \, (\text{mm}^{-1}) \quad (3)$$

$$0.23 \leq h_4 \leq 0.86 \quad (4)$$

$$1.5 \leq r_o \leq 3.0 \, (\text{mm}) \quad (5)$$

$$0.13 \leq NA \leq 0.17 \quad (6)$$

$$|\theta| \leq 50 \, (\text{minute}) \quad (7)$$

(where
$n_o$: refractive index on the center axis
$g$, $h_4$, $h_6$, $h_8$: refractive index distribution constants
$R_1$, $R_2$: curvature radii of incident surface and outgoing surface
$f$: focal length
$r_o$: lens radius
NA: numerical aperture at light source side
$\theta$: angle of normal of incident and outgoing surfaces with respect to optical axis).

Other and further objects, features and advantages of the invention will appear more fully from the following description.

DETAILED DESCRIPTION

Figure 1:
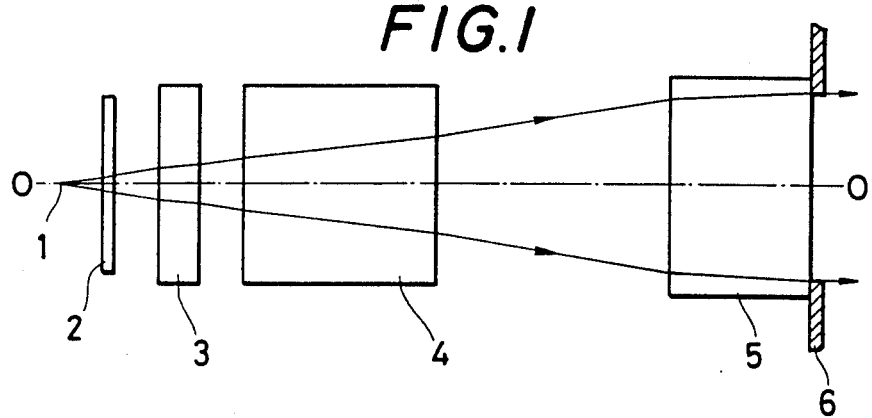
FIG. 1 is a diagram illustrating principle of an optical disc system using a collimator lens as an embodiment of the invention.
Figure 2:
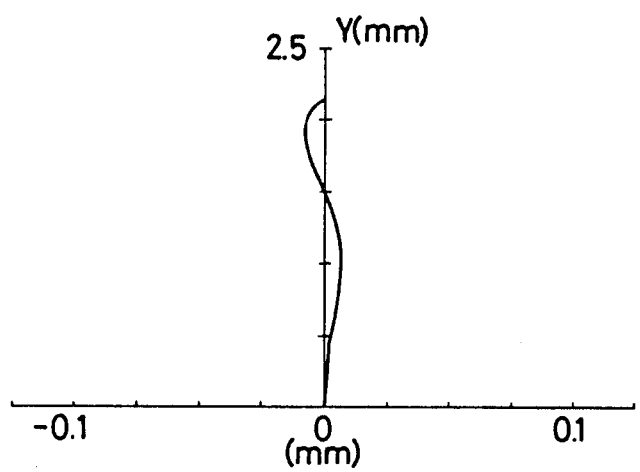
FIG. 2 through FIG. 7 are graphs illustrating spherical aberrations in examples 1 to 6, respectively.
Figure 3:
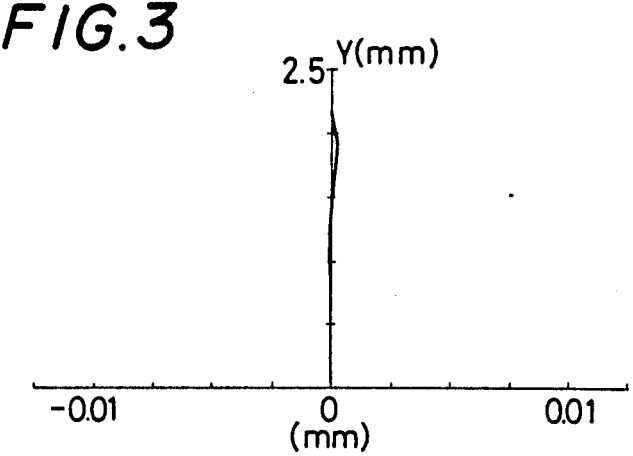
Figure 4:
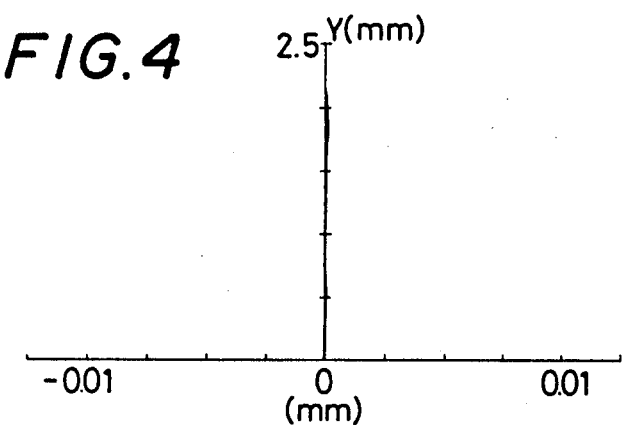
Figure 5:
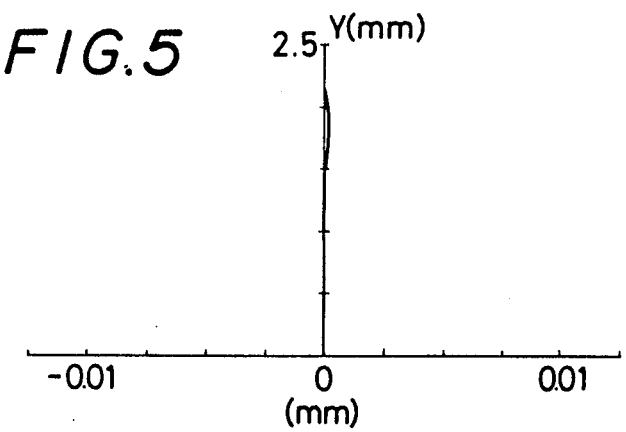
Figure 6:
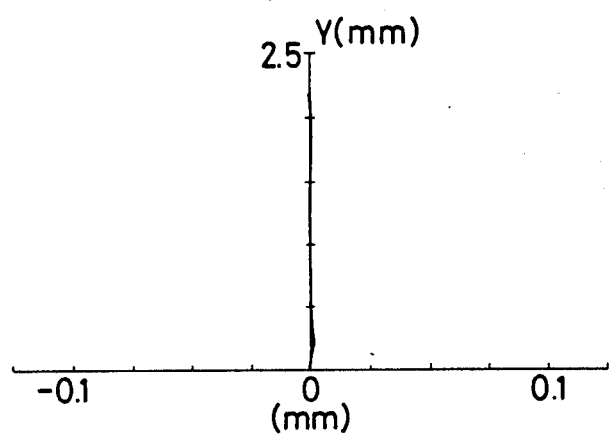
Figure 7:
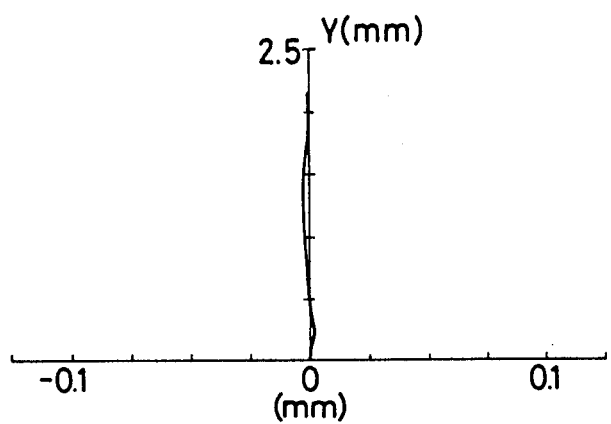

Conditions of the invention will now be described.

$$R_1 = R_2 = \infty \quad (1)$$

This condition means that both an incident surface and an outgoing surface of the lens are planes.

Since the lens of the invention is of cylindrical form with the incident surface and the outgoing surface being parallel planes, a number of lenses can be polished together in plane form simultaneously. Consequently, machining efficiency during the polishing is significantly improved and the machining cost is reduced well.

$$1.40/\sqrt{1-(g \cdot r)^2} \leq n_0 \leq 2.1 \quad (2)$$

This condition limits the center refractive index and the outermost refractive index of the lens.

$$1/\sqrt{f^2 - 23.43} \leq n_0 g \leq 1/(f \sin g) \, (\text{mm}^{-1}) \quad (3)$$

This condition is in relation to the lens length and the back focus.

The lower limit specifies limitation to take the back focus sufficient to form the effective optical system, whereas the upper limit specifies limitation where the lens becomes too short to be treated.

$$0.23 \leq h_4 \leq 0.86 \quad (4)$$

This condition is to correct spherical aberration of the lens well.

If the constant $h_4$ exceeds the upper limit, the spherical aberration is corrected excessively; if $h_4$ falls below the lower limit, the aberration is corrected insufficiently.

$$1.5 \leq r_o \leq 3.0 \, (\text{mm}) \quad (5)$$

This condition limits the radius of the lens, i.e., it shows that the lens is of small size. The lower limit of $r_o$ is deduced from combination with objective lens. In the case of the objective lens for an optical disc, for example, the diameter of the objective lens must be 3 mm or more in view of the acting distance and the numerical aperture. The collimator lens must be larger than the objective lens.

$$0.13 \leq NA \leq 0.17 \quad (6)$$

This condition is to collimate light from semiconductor laser with a radiation angle efficiently and into uniform intensity.

$$|\theta| \leq 50 \text{ (minute)} \quad (7)$$

This condition is that, when the incident and outgoing end surfaces of the lens are planes, the reflected light at each surface is prevented from returning to the semiconductor laser and deteriorating the oscillation characteristics of the laser. Further, when the incident and outgoing end surfaces of the lens are inclined uniformly as above described, the elliptic beam radiated from the semiconductor laser may be slightly corrected.

FIG. 1 shows and embodiment where a collimator lens of the invention is applied to an optical disc system.

In FIG. 1, reference numeral 1 designates a semiconductor laser as a light source, numeral 2 a cover glass, numeral 3 a diffraction grating for separating the correcting beam so as to perform the tracking control, and numeral 4 a polarization beam splitter. Numeral 5 designates a collimator lens as an embodiment of the invention, which is made of cylindrical transparent medium such as glass. Numeral 6 designates a diaphragm.

A beam radiated from the semiconductor laser 1 passes through the cover glass 2, the diffraction grating 3 and the polarization beam splitter 4, and then is projected on the collimator lens 5, where the incident rays are converted into parallel rays with the effective aperture corresponding to the diameter of the diaphragm 6 and projected on an objective lens for an optical disc (not shown).

Specific numerical examples of the collimator lens of the invention will be described in following table. In the table, Z represent the lens length.

from the lens center in the radial direction and the abscissa represents the aberration.

Since the collimator lens according to the invention is of cylindrical form with the incident end surface and the outgoing end surface being parallel planes, the productivity is good and therefore the manufacturing cost becomes low.

Further, the lens of the invention is a single lens and the aberration is corrected well even if the diameter and the center thickness are small, so the lens is of small size and light weight.

What is claimed is:

1. A collimator lens of refractive index distribution type for an optical recording/reproducing apparatus, wherein the collimator lens is made of cylindrical transparent medium with an incident surface and an outgoing surface being in parallel with each other and having the refractive index n(r) at position of distance r from the center axis expressed by:

$$n^2(r) = n_0^2 \{1 - (g \cdot r)^2 + h_4 (g \cdot r)^4 + h_6 (g \cdot r)^6 + h_8 (g \cdot r)^8 + \cdots\}$$

and further satisfies conditions that $$R_1 = R_2 = \infty \quad (1)$$

$$1.40/\sqrt{1-(g \cdot r)^2} \leq n_0 \leq 2.1 \quad (2)$$

$$1/\sqrt{f^2 - 23.43} \leq n_0 g \leq 1/(f \sin g) \text{ (mm}^{-1}) \quad (3)$$

$$0.23 \leq h_4 \leq 0.86 \quad (4)$$

$$1.5 \leq r_o \leq 3.0 \text{ (mm)} \quad (5)$$

$$0.13 \leq NA \leq 0.17 \quad (6)$$

$$|\theta| \leq 50 \text{ (minute)} \quad (7)$$

(where $n_o$: refractive index on the center axis $g, h_4, h_6, h_8$: refractive index distribution constants $R_1, R_2$: curvature radii of incident surface and outgoing surface f: focal length $r_o$: lens radius NA: numerical aperture at light source side $\theta$: angle of normal of incident and outgoing surfaces with respect to optical axis).

| Example | 1 | 2 | 3 | 4 | 5 | 6 |
|---|---|---|---|---|---|---|
| $R_1$ | ∞ | ∞ | ∞ | ∞ | ∞ | ∞ |
| $R_2$ | ∞ | ∞ | ∞ | ∞ | ∞ | ∞ |
| $n_o$ | 1.6366 | 1.45 | 1.7 | 1.8 | 1.5 | 2.0 |
| g(mm$^{-1}$) | 0.1191 | 0.09 | 0.09 | 0.13 | 0.22 | 0.06 |
| $h_4$ | 0.4 | 0.39 | 0.44 | 0.35 | 0.28 | 0.59 |
| $h_6$ | −1.367 | −0.0168 | −0.0791 | −0.0454 | −0.0142 | 3.22 |
| $h_8$ | 10.376 | −1.050 | −0.8588 | −0.0810 | −0.00015 | −105.7 |
| Z(mm) | 3.335 | 5.403 | 5.725 | 2.692 | 1.048 | 11.322 |
| $\theta$ (sec) | 10 | 0 | 0 | 0 | 40 | 3 |

FIG. 2 to FIG. 7 show the spherical aberration of the collimator lenses in the examples 1 to 6 respectively. In each of the figures, the ordinate Y represents distance

* * * * *